J. W. Cleveland,
Tire Upsetter.
No. 89558. Patented May 4, 1869.
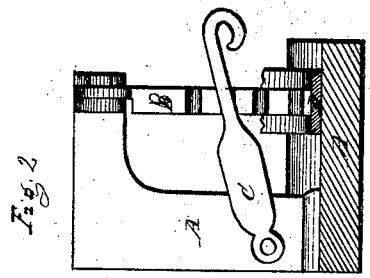
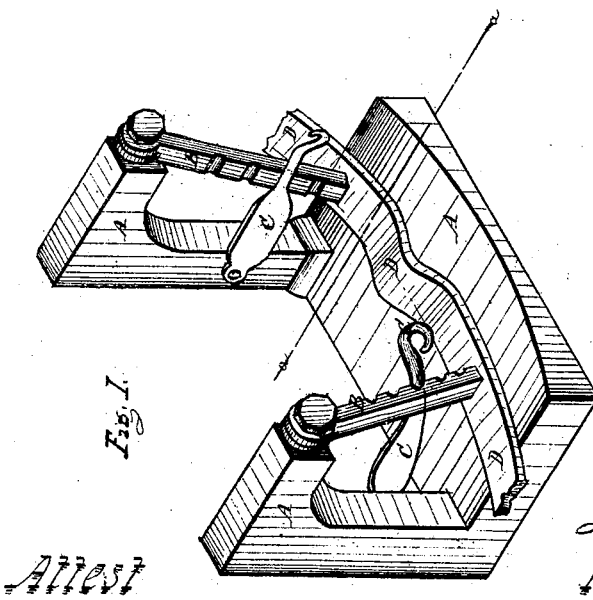
Attest
Inventor
J. W. Cleveland
by
Edson Brothers
Attys

United States Patent Office.

J. W. CLEVELAND, OF NORTH TUNBRIDGE, VERMONT.

Letters Patent No. 89,558, dated May 4, 1869.

IMPROVED TIRE-MACHINE.

The Schedule referred to in these Letters Patent and making part of the same.

*To all whom it may concern:*

Be it known that I, J. W. CLEVELAND, of North Tunbridge, in the county of Orange, and State of Vermont, have invented certain Improvements in Machines for Upsetting Tires; and I do hereby declare that the following is a full and exact description thereof, reference being had to the accompanying drawing, and to the letters of reference marked thereon.

This invention relates to machines for upsetting tires, and it consists in the arrangement of the means hereinafter described.

In the drawings—

Figure 1 is a perspective view of my device.

Figure 2 is a sectional elevation thereof, on line *a a* of fig. 1.

Corresponding letters denote corresponding parts in both figures.

A is a frame, of cast-iron, or any other suitable material, the bottom side of which is a smooth parallel surface, which enables it to be screwed to any suitable foundation for holding it in the proper position.

From the rear corners, or those farthest from the side upon which the operator stands, arise two columns, one from each of the said corners, which extend upward for a distance of from three to six inches, their upper ends being provided with an arm or projection, which extends forward to about the centre of the frame or bed-plate A, for the purpose of receiving dogs, or clamps B B. The upper surface of the bed-plate of frame A is in form the segment of a circle, to facilitate the operation of upsetting the tire, and to aid in preserving the contour thereof.

B B are dogs or clamps, for holding the tire in position while being operated upon. They are screwed to the forwardly-projecting corners, or portions of the columns formed upon the frame, to which they are screwed by means of strong bolts, which enter threaded holes prepared for them in said arms. These dogs or clamps are of such a height, that when screwed, as above described, at their upper ends, and allowed to hang in a pendent position, their lower ends will come in contact with the bed-plate, just previous to their assuming a vertical position, as will be seen by reference to fig. 1 of the drawings, the object of the above-described arrangement of the clamps being to cause them to press more and more firmly upon the tire or bar to be manipulated as the levers C C are forced down upon their faces, they having notches or depressions formed thereon, to receive a corresponding projection upon such lever.

C C are levers or springs, the inner ends of which are secured to the inner sides of the columns A A, by means of a bolt upon which they turn.

From their point of suspension, said levers extend forward to any required distance, to give the operator the proper control of them; and they are provided, at the proper point, with projections for engaging with the notches or depressions in the faces of the clamps, so that, as they are forced downward upon such faces, the said projections will enter some one of such depressions, and thus hold firmly in position the work to be operated upon.

The operation of this device is as follows:

When it is desired to reduce the diameter of a wagon or other tire, by upsetting it, a curve similar to the one shown in the bar marked D in fig. 1, is formed in such tire. It is then heated; after which it is placed upon the bed of the device, and the dogs or clamps are allowed to rest upon its inner surface. The levers are then pressed downward, which causes the dogs or clamps to be pressed upon the tire, to such an extent as to prevent any slipping or straightening of the tire, as the curved portion which is between such dogs receives the blows of the hammer, which blows, it will be observed, as they tend to elongate the iron, secure the hold of the dogs more firmly upon such iron.

Having thus described my invention,

What I claim as new, and desire to secure by Letters Patent from the United States, is—

The arrangement of the bed and uprights A A, dogs, or clamps B B, and levers, or springs C C, as shown and described.

In testimony whereof, I have signed my name to this specification, in the presence of two subscribing witnesses.

J. W. CLEVELAND.

Witnesses:
   J. M. JONES,
   SAML. B. HACKETT.